US008495208B2

United States Patent
Hansson et al.

(10) Patent No.: US 8,495,208 B2
(45) Date of Patent: *Jul. 23, 2013

(54) MIGRATING VIRTUAL MACHINES AMONG NETWORKED SERVERS UPON DETECTION OF DEGRADING NETWORK LINK OPERATION

(75) Inventors: Nils P. Hansson, Monroe, WA (US); Bruce A. Smith, Austin, TX (US); Edward S. Suffern, Chapel Hill, NC (US); James L. Wooldridge, Fall City, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/462,900

(22) Filed: May 3, 2012

(65) Prior Publication Data
US 2012/0221887 A1 Aug. 30, 2012

Related U.S. Application Data

(63) Continuation of application No. 12/784,061, filed on May 20, 2010, now Pat. No. 8,224,957.

(51) Int. Cl.
*G06F 15/16* (2006.01)
*G06F 12/00* (2006.01)

(52) U.S. Cl.
USPC .......................................... 709/224; 709/250

(58) Field of Classification Search
USPC ................... 709/223–229, 238, 250
See application file for complete search history.

(56) References Cited

U.S. PATENT DOCUMENTS

| | | | | |
|---|---|---|---|---|
| 6,970,913 | B1 * | 11/2005 | Albert et al. ................... | 709/217 |
| 8,224,957 | B2 * | 7/2012 | Hansson et al. ............... | 709/224 |
| 2001/0052016 | A1 * | 12/2001 | Skene et al. ................... | 709/226 |
| 2008/0104608 | A1 * | 5/2008 | Hyser et al. ................... | 718/105 |
| 2008/0295096 | A1 * | 11/2008 | Beaty et al. ....................... | 718/1 |
| 2009/0138752 | A1 * | 5/2009 | Graham et al. ................... | 714/4 |
| 2009/0228589 | A1 * | 9/2009 | Korupolu ...................... | 709/226 |
| 2010/0054129 | A1 * | 3/2010 | Kuik et al. ..................... | 370/235 |
| 2010/0281482 | A1 * | 11/2010 | Pike et al. ...................... | 718/102 |
| 2010/0322237 | A1 * | 12/2010 | Raja et al. ..................... | 370/389 |
| 2010/0325279 | A1 * | 12/2010 | Heim ............................ | 709/226 |
| 2011/0134761 | A1 * | 6/2011 | Smith et al. ................... | 370/252 |

\* cited by examiner

*Primary Examiner* — Zarni Maung
(74) *Attorney, Agent, or Firm* — Brandon C. Kennedy; Cynthia G. Seal; Biggers & Ohanian, LLP

(57) ABSTRACT

Migrating virtual machines among networked servers, the servers coupled for data communications with a data communications network that includes a networking device, where migrating includes: establishing, by a virtual machine management module ('VMMM'), one or more virtual machines on a particular server; querying, by the VMMM, the networking device for link statistics of a link coupling the network device to the particular server for data communications; determining, by the VMMM in dependence upon the link statistics, whether the link coupling the network device to the particular server is degrading; and if the link coupling the network device to the particular server is degrading, migrating a virtual machine executing on the particular server to a destination server. In some embodiments, migrating occurs is carried out only if non-degrading link is available. If no non-degrading links are available, the network device, rather than the link, may be failing.

18 Claims, 8 Drawing Sheets

MIGRATING VIRTUAL MACHINES AMONG NETWORKED SERVERS UPON DETECTION OF DEGRADING NETWORK LINK OPERATION

CROSS-REFERENCE TO RELATED APPLICATION

This application is a continuation application of and claims priority from U.S. patent application Ser. No. 12/784,061, filed on May 20, 2010.

BACKGROUND OF THE INVENTION

1. Field of the Invention

The field of the invention is data processing, or, more specifically, methods, apparatus, and products for migrating virtual machines among networked servers upon detection of degrading network link operation.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems today are often networked for data communications and often run several operating systems concurrently through the use of virtual machines—software emulating hardware. From time to time network devices and data communications links coupling the computer systems may begin to fail. Methods of maintaining data communications among virtual machines and computer systems running the virtual machines today typically wait until complete communication failure occurs before corrective action is taken or require, from the computers running the virtual machines, a large amount of processing power.

SUMMARY OF THE INVENTION

Methods, apparatus, and products for migrating virtual machines among networked servers are described. In embodiments of the present invention, the servers are coupled for data communications with a data communications network that includes a networking device. Migrating virtual machines in accordance with embodiments of the present invention includes establishing, by a virtual machine management module ('VMMM'), one or more virtual machines on a particular server; querying, by the VMMM, the networking device for link statistics of a link coupling the network device to the particular server for data communications; and determining, by the VMMM in dependence upon the link statistics, whether the link coupling the network device to the particular server is degrading. If the link coupling the network device to the particular server is degrading, migrating a virtual machine executing on the particular server to a destination server.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
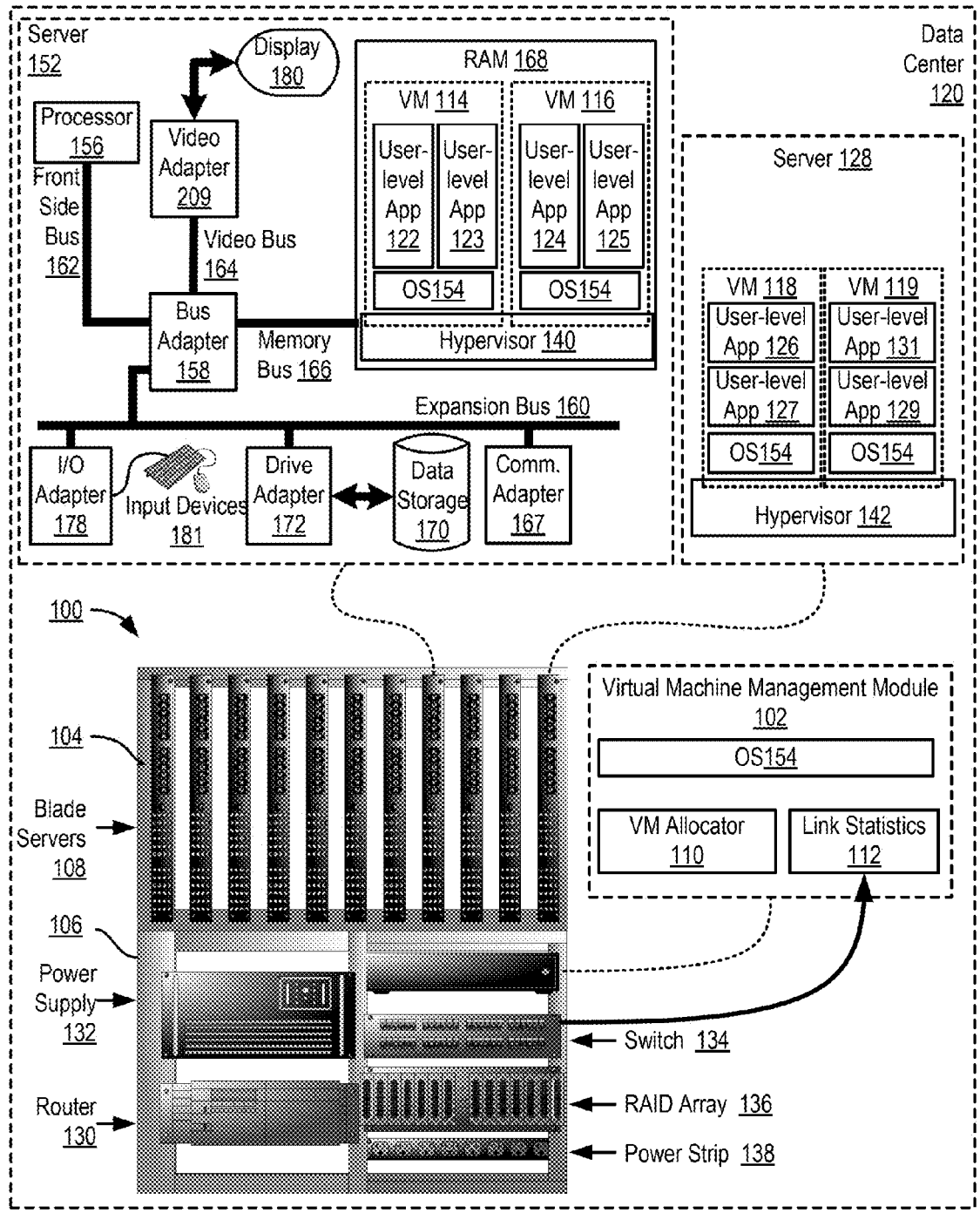
FIG. 1 sets forth a line drawing of an exemplary data center in which virtual machines are migrated among networked servers according to embodiments of the present invention.

Exemplary methods, apparatus, and products for migrating virtual machines among networked servers in accordance with the present invention are described with reference to the accompanying drawings, beginning with FIG. 1. FIG. 1 sets forth a line drawing of an exemplary data center in which virtual machines are migrated among networked servers according to embodiments of the present invention. A data center (120) is a facility used to house mission critical computer systems and associated components. Such a data center may include environmental controls (air conditioning, fire suppression, etc.), redundant/backup power supplies, redundant data communications connections, and high security, highlighted by biometric access controls to compartmentalized security zones within the facility. A data center may also house a large amount of electronic equipment, typically computers and communications equipment. A data center may be maintained by an organization for the purpose of handling the data necessary for its operations. A bank, for example, may have a data center, where the bank customers' account information is maintained and transactions involving these accounts are carried out. Practically every company that is mid-sized or larger has some kind of data center with the larger companies often having dozens of data centers.

A virtual machine ('VM') as the term is used in this specification refers to a software implementation of a machine, such as a computer. A virtual machine enables sharing of the underlying physical machine resources between different virtual machines, each of which may run its own operating system. The software layer providing the virtualization is called a virtual machine monitor or hypervisor. A hypervisor is a module of automated computing machinery that performs software and hardware platform-virtualization in order to enable multiple operating systems to run on a host computer concurrently in separate virtual machines. A hypervisor runs directly on the host's hardware to control hardware access and to monitor guest operating-systems. A guest operating system runs on a level above the hypervisor. The platform virtualization provided by a hypervisor is referred to in this specification as a virtualized environment. A virtualized environment is one in which physical characteristics of a computing platform—computer processors, computer memory, I/O adapters, and the like—are abstracted from the perspective of an operating system and other software applications.

VMs provide many benefits including, for example:
- multiple OS environments can co-exist on the same physical computer hardware resources, in strong isolation from each other;
- an instruction set architecture (ISA) that is somewhat different from that of the ISA of the underlying physical computer hardware resources;
- application provisioning, maintenance, high availability and disaster recovery; and
- other benefits as will occur to readers of skill in the art.

The system of FIG. 1 is generally capable of VM migration among the servers. 'Migration,' as the term is used in this specification, is the effective movement of a virtual machine from one physical server to another physical server. Migration is descried here in terms of an 'effective' move of a VM from one server to another, because migration refers not to the means of movement, but to the end result of the movement. That is, migration describes two states, one state in which a particular VM is executing on a particular server, and a second state in which the particular VM is no longer executing on the particular server but is instead executing on another server. From the first state to the second state, therefore, one may describe the particular VM as having been moved from the particular server to the other server. The means by which such a 'movement' of a VM is carried out, however, may vary greatly within the scope of the present invention. Migrating a VM from a particular server to another server may include, for example, copying data representing the VM executing on the particular server from the particular server's memory to memory of another server, uploading to and executing on another server, a previously established image of the VM executing on the particular server and halting execution of the VM executing on the particular server, establishing a default image of a virtual machine in another server and executing in the default image of the VM of instances of the same user-level applications executing in the VM of the particular server, and so on.

The example data center (120) in the example of FIG. 1 includes a blade Center™ (100), a type of server chassis specifically configured to house a number of blade servers. A server, as the term is used in this specification, refers generally to a multi-user computer that provides a service (e.g. database access, file transfer, remote access) or resources (e.g. file space) over a network connection. The term 'server,' as context requires, refers inclusively to the server's computer hardware as well as any server application software or operating system software running on the server. A server application is an application program that accepts connections in order to service requests from users by sending back responses. A server application can run on the same computer as the client application using it, or a server application can accept connections through a computer network. Examples of server applications include file server, database server, backup server, print server, mail server, web server, FTP servers, application servers, VPN servers, DHCP servers, DNS servers, WINS servers, logon servers, security servers, domain controllers, backup domain controllers, proxy servers, firewalls, and so on.

A blade server is a server computer with a modular design optimized to minimize the use of physical space and energy. Whereas a standard rack-mount server can function with at least a power cord and network cable, blade servers have many components removed to save space, minimize power consumption and other considerations, while still having all the functional components to be considered a computer. A blade center, which can hold multiple blade servers, provides services such as power, cooling, networking, various interconnects and management—though different blade providers have differing principles around what to include in the blade itself (and sometimes in the enclosure altogether).

In the example of FIG. 1, the blade center (100) includes two cabinet bays (104, 106), each of which includes several components. Cabinet bay (104) contains a number of blade servers (108), each of which is powered by a power supply (132). Cabinet bay (106) contains the power supply (132) for the blade center (100), a data communications network router (130), a network switch (134), and a virtual machine management module ('VMMM') (102) which is described below in more detail. Cabinet bay (106) also contains a Redundant Array of Independent Disks ('RAID') (136) and a power strip (138).

In FIG. 1, two of the blade servers (108) in the blade center (100) are depicted in an expanded form for clarity of explanation: blade server (152) and blade server (128). Readers of skill in the art will understand, however, that each of the blade servers (108) of the blade center (100) may include similar components to servers (152, 128) and operate in a similar fashion when participating in VM migration in accordance with embodiments of the present invention. Consider, as an example of server useful in systems in which VM migration is carried out in accordance with embodiments of the present invention, server (152). Server (152) includes at least one computer processor (156) or 'CPU' as well as random access memory (168) ('RAM') which is connected through a high speed memory bus (166) and bus adapter (158) to processor (156) and to other components of the server (152).

Stored in RAM (168) of the server (152) is a hypervisor (140) that enables two virtual machines (114, 116) to run on the server's (152) underlying hardware and utilize the server's (152) hardware resources. Executing within (or said another way, 'on') virtual machine (114), is an operating system (154) and two user-level applications (122, 123). Operating systems useful in servers that participate in VM migration according to embodiments of the present invention include UNIX™, Linux™, Microsoft XP™, AIX™, IBM's i5/OS™, and others as will occur to those of skill in the art. Executing within virtual machine (116) is an operating system (154) and two user-level applications (124, 125). Operating system (154) executing within virtual machine (116) may be a separate instance of the same operating system (154) executing in virtual machine (114), or may be another type of operating system (154) altogether. That is, both operating systems in server (152) may be the same—such as Unix™—or both operating systems may be different—such as Unix™ and Microsoft XP™.

The hypervisor (140), operating systems (154), and user-level applications (122-125) in the example of FIG. 1 are shown in RAM (168), but many components of such software typically are stored in non-volatile memory also, such as, for example, on a disk drive (170).

The server (152) of FIG. 1 includes disk drive adapter (172) coupled through expansion bus (160) and bus adapter (158) to processor (156) and other components of the server (152). Disk drive adapter (172) connects non-volatile data storage to the server (152) in the form of disk drive (170). Disk drive adapters useful in servers that participate in virtual machine migration among networked servers according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example server (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example server (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary server (152) of FIG. 1 includes a communications adapter (167) for data communications with other computers and for data communications with a data communications network (not shown in FIG. 1). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in servers that participate in VM migration according to embodiments of the present invention include modems for wired dial-up communications, Ethernet (IEEE 802.3) adapters for wired data communications network communications, and 802.11 adapters for wireless data communications network communications.

Although only server (152) is depicted as including a processor (156), RAM (168), bus adapter (158), communications adapter (167) and the like, readers of skill in the art will recognize that any of the blade servers (108) in the example of FIG. 1 and, more specifically, server (128), may also include similar components.

The switch (134) of the blade center (100) of FIG. 1 is an example of a network device, a unit that mediates data in a computer network. Networking devices may also be referred to as network equipment, Intermediate Systems (IS) or Inter-Working Units (IWUs). Units which are the last receiver or generate data are called hosts or data terminal equipment.

Examples of networking devices include:

Gateway: a device at a network node that interfaces with another network that uses different protocols. Operates on Open System Interconnection ('OSI') layers 4 to 7.

Router: a specialized network device that determines the next network point to which to forward a data packet toward its destination. Typically operates on OSI layer 3.

Bridge: a device that connects multiple network segments along the data link layer. Operates on OSI layer 2.

Switch: a device that allocates traffic from one network segment to certain lines or 'links'—intended destination or destinations which connect the segment to another network segment. Unlike a hub, a switch splits the network traffic and sends it to different destinations rather than to all systems on the network. Operates on OSI layer 2.

Multilayer Switch: a switch which, in addition to switching on OSI layer 2, provides functionality at higher protocol layers.

Hub: a device that connects multiple segments together and operates them as if they were a single segment. When using a hub, every attached device shares the same broadcast domain and the same collision domain. Therefore, only one computer connected to the hub is able to transmit at a time. Depending on the network topology, the hub provides a level 1 OSI model connection among the network objects (workstations, servers, etc). The hub may also provide bandwidth that is shared among all the objects, compared to switches, which provide a dedicated connection between individual nodes. Operates on OSI layer 1.

Repeater: a device that amplifies or regenerates digital signals received while setting the digital signals from one part of a network into another. Operates on OSI layer 1.

Protocol Converter: a hardware device that converts between two different types of transmissions, such as asynchronous and synchronous transmissions.

Bridge Router: a device that operates in a combination of router and bridge functionality. Operates on both OSI layer 2 and OSI layer 3.

Digital media receiver: a device that connects a computer network to a home theatre The switch (134) in the example of FIG. 1, couples the blade servers (108, including 152 and 128) for data communications with one another and with the router (130) and the VMMM (102).

The virtual machine management module (102) ('VMMM') of FIG. 1 is a module of automated computing machinery comprising an aggregation of computer hardware and software that is configured to carry out virtual machine migration among the networked servers (108 including 152 and 128) in the example of FIG. 1. The VMMM may also be responsible for other virtual machine management, regardless of migration technique. That is, the VMMM (102) may also manage allocation of VMs among servers in a manner to balance workload, redundancy, or availability. The VMMM (102) may manage operation of VMs by managing resource allocation or working with another management module to control operating characteristics—throttling servers and the like. The VMMM (102) may also manage de-allocation of virtual machines, selecting whether a virtual machine be put in a standby mode rather than powered off completely and so on. These are but a few of the many tasks a VMMM that operates for VM migration in accordance with embodiments of the present invention may perform.

The VMMM (102) in the example of FIG. 1 may migrate VMs among the blade servers (108) in the blade center (100)

of FIG. 1 in accordance with embodiments of the present invention by, first, establishing one or more VMs on a particular server. Consider, for purposes of explanation, that the VMMM (102) in the example of FIG. 1 establishes a virtual machine (114) and virtual machine (116) on the server (152). The VMMM may then query the networking device—the switch (134)—for link statistics (112) of a link coupling the network device to the particular server for data communications. A link as the term is described here refers, as context requires, to a physical or a logical coupling between two devices to support data communications between the devices. Link statistics describe data communications passing along links coupling the servers (108, 152, 128) to one another and the switch (134).

The VMMM (102) may then determine, in dependence upon the link statistics (112), whether the link coupling the network device to the particular server is degrading and if the link coupling the network device to the particular server is degrading, the VMMM may migrate a virtual machine executing on the particular server (152), such as VM (114), to a destination server, such as server (128).

Consider as an example of the VMMM (102) carrying out VM migration in the data center (120) of FIG. 1, that the VMMM (102) first establishes VM (114) and VM (116) on server (152) and establishes no VMs on server (128). As the servers (108), including server (152) and server (128), pass data communications messages between one another via the network switch (134), the network switch (134) monitors the data communications and stores link statistics in a predefined memory region accessible by the VMMM (102) via query. From time to time, the VMMM (102) queries the switch (134) for the link statistics (112) and determines whether the link coupling server (152) and the switch (134) is degrading. If the link is degrading, the VMMM (102) migrates the VM (114) and the VM (116) to the server (128)—depicted here as VM (118) and VM (119). If no hypervisor is currently executing in servers (128), the VMMM may also first initiate the hypervisor (142) in servers (128) prior to establishing the VMs (118, 119). In addition to the VMs, the VMMM (102) may also migrate the user-level applications (122-125) executing in the VMs (114, 116) of server (152) to the VMs (118, 119) of server (128). In the example of FIG. 1, user-level applications (122-125) have been migrated and are depicted as user-level applications (126, 127, 129, and 131).

The term 'degrading' as used here to describe a communication link refers to a link which may be performing at a substandard level and may be near failure. Here, the term 'degrading' is used to indicate that VM migration is carried out in a proactive—mitigation focused—manner rather than a reactive manner. That is, rather than migrating a VM after failure of a link, the VMMM in the example of FIG. 1 migrates a VM prior to a complete failure, mitigating the loss of data communications, productivity, and so on that might otherwise occur if the link completely failed. In this way, availability of the server and the VM is increased. Readers of skill in the art will also appreciate that monitoring data communications and determining whether a link is degrading is carried out not by a hypervisor supporting and enabling a VM, but rather by network devices and a VMMM. In this way, the hypervisor and therefore the server upon which the hypervisor operates does not bear the burden of monitoring data communications or determining whether data communications links are degrading—increasing efficiency of operation of the server and decreasing operational overhead.

Links may be degrading due to various causes including for example, due to electromagnetic interference that introduces signal errors that causes Cyclical Redundancy Check (CRC) errors in data communications packets, due to aging physical cables which causes interlink symbol signals to mismatch the switch hardware to cable characteristics. These are but a few example causes of link degradation among many possible factors and each such cause is well within the scope of the present invention.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
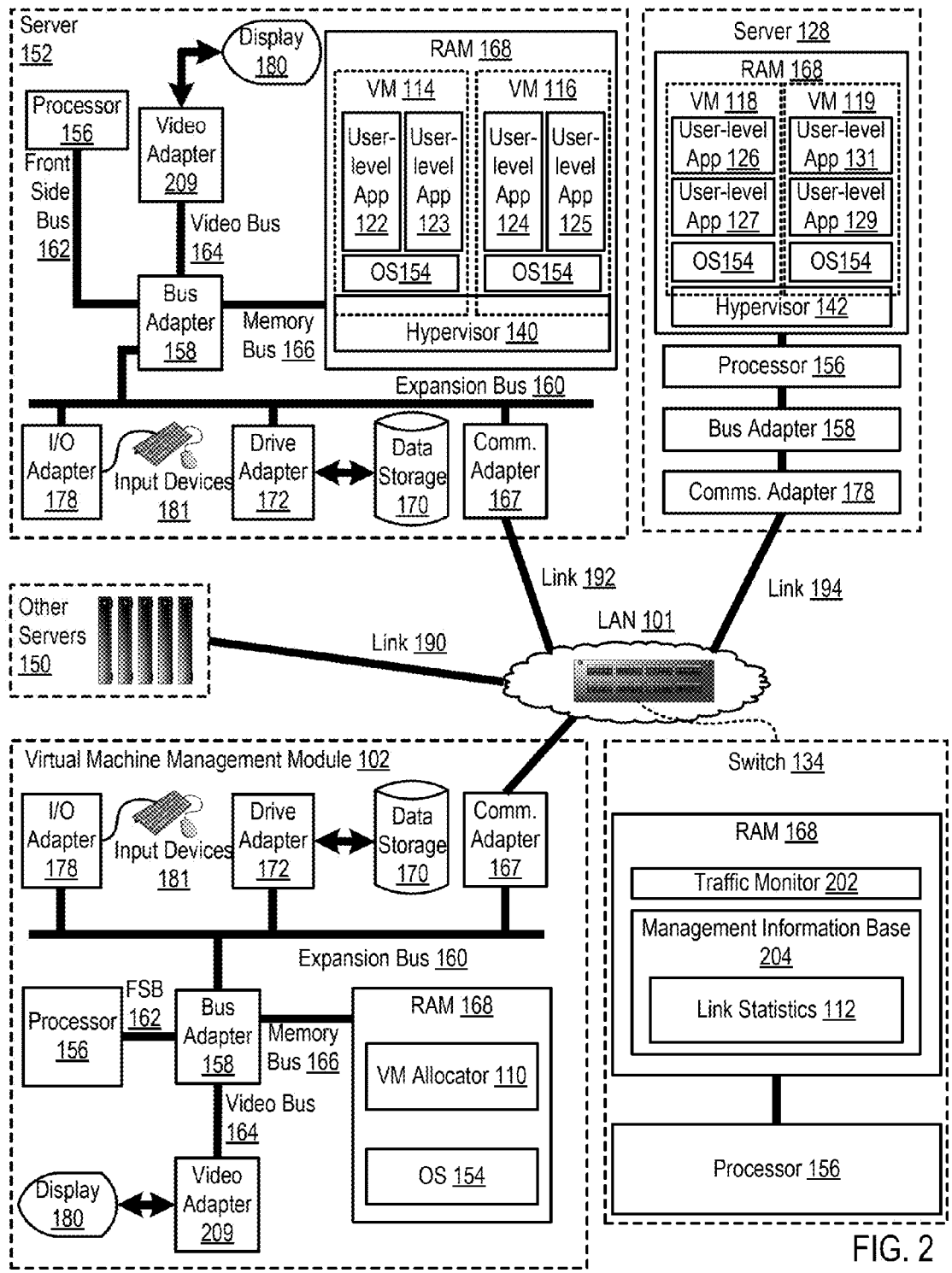
FIG. 2 sets forth a network diagram of an exemplary system for migrating virtual machines among networked servers according to embodiments of the present invention.

FIG. 2 sets forth a network diagram of an exemplary system for migrating virtual machines among networked servers according to embodiments of the present invention. The exemplary system of FIG. 2 is similar to the system depicted in the example of FIG. 1 in that the system of FIG. 2 also includes servers (152, 128), a network device in the form of a switch (134), and a VMMM (102), all of which are coupled or data communications with one another via a data communications network, a local area network ('LAN') (101). The servers (152, 128) and VMMM (102) are also coupled to other servers (150) for data communications.

The servers (152, 128, and 150) in the example system of FIG. 2 are coupled for data communications to the switch (134) via data communications links. The server (152) is coupled for data communications to the data communications network (101) and the switch (134) through link (192), the server (128) is coupled for data communications to the data communications network (101) and the switch (134) through link (194), and at least one of the other servers (150) is coupled for data communications to the data communications network (101) and the switch (134) through the link (190). A link as the term is described here refers, as context requires, to a physical or a logical coupling between two devices to support data communications between the devices. An Ethernet cable coupling a server to a switch, for example, may be an example of a 'link.' A logical coupling between specified by two endpoints—a server and a port of a switch, for example—may also be an example of a link. The term 'coupled' as used here to describe a relationship between a network device and a server refers to describes any connection, direct or otherwise, between a the server and network device. That is, the term 'coupled,' in describing a relationship between a network device and a server, is not limited to a direct physical connection between the network device and the network devices, but may also include an indirect connection through other network devices.

In the system of FIG. 2, the servers (152, 128, and 150) are implemented as computers that include similar components—processor (156), RAM (168), bus adapter (158), communications adapter (178), and the like—as the servers depicted in, and described with respect to, FIG. 1. The switch (134), in the example of FIG. 2, is also implemented as a type of computer, that is, automated computing machinery, similar to the servers (152, and 128). The switch (134) includes a processor (156) coupled to RAM (168). The switch, of course, may include more components, software and hardware, but for clarity of explanation is depicted in the example of FIG. 2 with only RAM and a processor. Stored in RAM (168) of the switch (134) is a traffic monitor (202). A traffic monitor (202) is a module of computer program instructions that when executed cause the network switch (134) to monitor data communications among the servers (152, 128, 150) passing along links (190, 192, 194) coupling the servers (152, 128, 150) to one another and the switch (134) and store, in a management information base ('MIB') (204), link statistics (112) describing the data communications among the servers passing along the links coupling the servers to one another and the switch. Examples of link statistics include, for each link, a number of bytes transmitted from a particular device along the link, a number of bytes received by the particular device along the link, a number of bytes in error carried along the link, and instances of symbol errors propagated along the link, among others.

As mentioned above, link statistics may be stored in an MIB. An MIB is a virtual database used for managing the entities in a communications network. The database is hierarchical (tree-structured) and entries are addressed through object identifiers. Internet documentation Request For Comments ('RFCs') discuss MIBs, notably RFC 1155, "Structure and Identification of Management Information for TCP/IP based internets," and its two companions, RFC 1213, "Management Information Base for Network Management of TCP/IP-based internets," and RFC 1157, "A Simple Network Management Protocol."

In addition to the switch (134), and as mentioned above with respect to FIG. 1, the VMMM (102) may also be implemented as automated computing machinery—that is, as a computer. For further explanation, therefore, FIG. 2 sets forth an example VMMM (102) implemented as a computer. The example VMMM (102) of FIG. 2 includes components similar to those of the servers (152, 128): a processor (156), a bus adapter (158), a communications adapter (178), RAM (168), and so on. Stored in RAM (168) of the VMMM (102) is a virtual machine allocator (110). The VM allocator (110) is a module of computer program instructions that when executed migrates virtual machines among networked servers in accordance with embodiments of the present invention. The example VM allocator (110) may migrate VMs among the servers (152, 128, and 150) in the system of FIG. 2 by first, establishing one or more virtual machines (114,116) on a particular server, querying the networking device (134) for link statistics (112) of a link (192) coupling the network device (134) to the particular server (152) for data communications, determining, in dependence upon the link statistics (112), whether the link (192) coupling the network device (134) to the particular server (152) is degrading, and migrating a virtual machine (114, 116) executing on the particular server (152) to a destination server (128 or 150) if the link (192) is degrading.

In addition to the migration of virtual machines (114, 116), the VM allocator (110) may also migrate the user-level applications (122,123,124,125) executing within the VMs (114, 116). In the system of FIG. 2, for example, the VM allocator (110) may migrate VM (114) on server (152) to a VM (118) on server (128). The VM allocator (110) may also migrate user-level applications (122, 123) executing within VM (114) to user-level applications (126, 127) executing within VM (118). In a similar manner, the VM allocator (110) may migrate VM (116) on server (152) to a VM (119) on server (128). The VM allocator (110) may also migrate user-level applications (124, 125) executing within VM (116) to user-level applications (129, 131) executing within VM (119).

The arrangement of servers and other devices making up the exemplary system illustrated in FIG. 2 are for explanation, not for limitation. Data processing systems useful according to various embodiments of the present invention may include additional servers, routers, other devices, and peer-to-peer architectures, not shown in FIG. 2, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 2.

Figure 3:
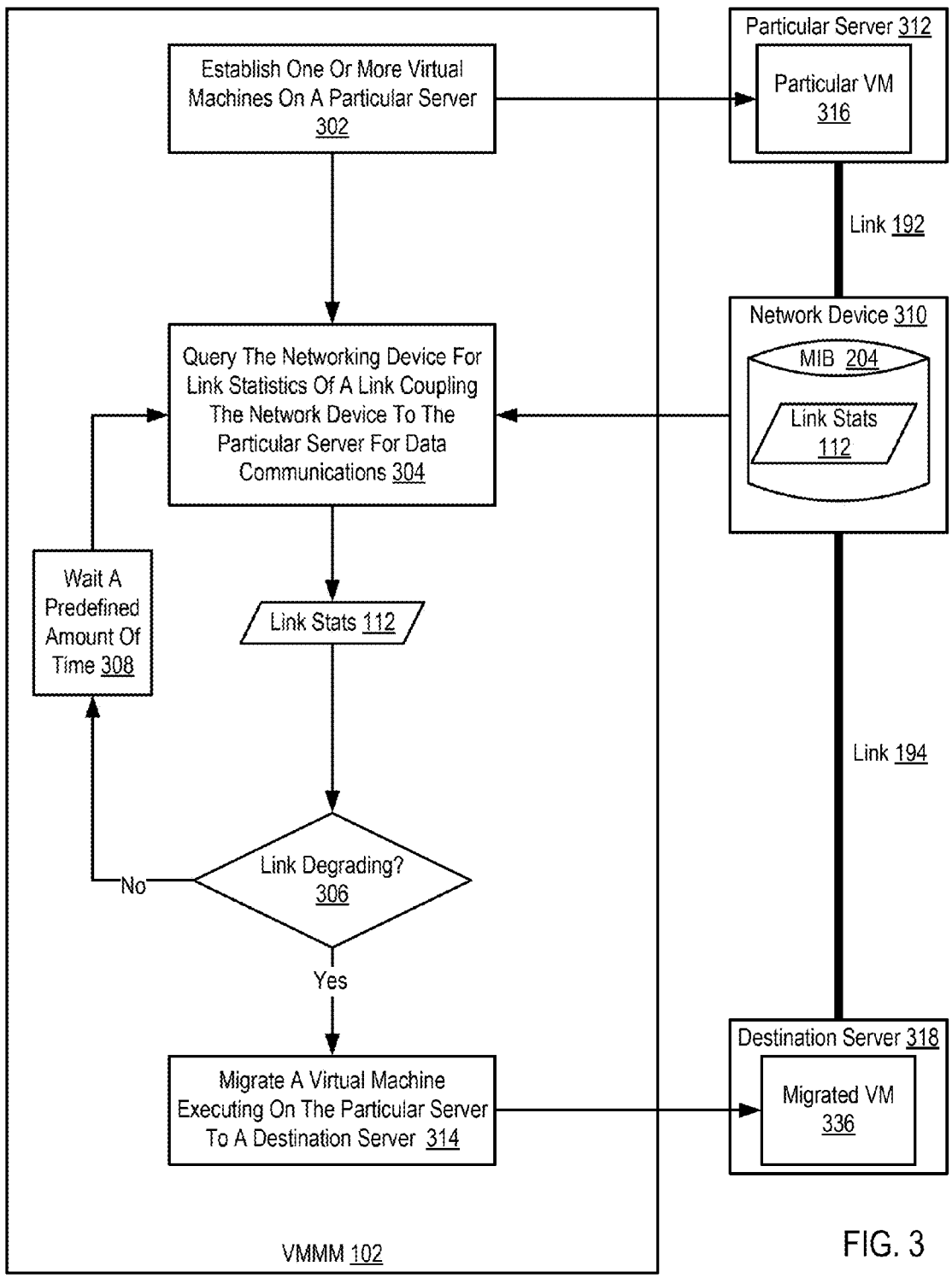
FIG. 3 sets forth a flow chart illustrating an exemplary method for migrating virtual machines among networked servers according to embodiments of the present invention.

For further explanation, FIG. 3 sets forth a flow chart illustrating an exemplary method for migrating virtual machines among networked servers according to embodiments of the present invention. In the method of FIG. 3, the servers (312, 318) are coupled, through data communications links (192, 194) for data communications with a data communications network that includes a networking device (310). A networking device as the term is used in this specification refers to automated computing machinery capable of coupling other devices for data communications and capable of providing link statistics describing data communications passing along links coupling the other devices to one another and the network device. Examples of networking devices include a network switch, a network router, a hub, and so on as will occur to readers of skill in the art.

The method of FIG. 3 includes establishing (302), by a virtual machine management module (102), one or more virtual machines (316) on a particular server (312). Establishing (302), by a virtual machine management module (102), one or more virtual machines (316) on a particular server (312) may be carried out by executing a hypervisor on the particular server and configuring the hypervisor to support a virtual machine of a particular configuration—number of processors, memory resources, and so on as will occur to readers of skill in the art.

The method of FIG. 3 also includes querying (304), by the VMMM (102), the networking device (310) for link statistics (112) of a link (192) coupling the network device (310) to the particular server (312) for data communications. Querying (304) the networking device (310) for link statistics (112) may be carried out in various ways including, for example, by sending a request to a network address or port of the network device pre-designated as a network address or port for receiving MIB (204)-related queries, where the request includes an object identifier identifying a particular link or an object identifier that identifies the particular server. Another way in which the VMMM may query for link statistics (112) is to request all data regarding data communications traffic stored in the network device and derive from the requested data, the link statistics (112).

The method of FIG. 3 also includes determining (306), by the VMMM (102) in dependence upon the link statistics (112), whether the link (192) coupling the network device (310) to the particular server (312) is degrading and if the link (192) coupling the network device (310) to the particular server (312) is not degrading, waiting (308) a predefined amount of time before querying the network device again. That is, in the method of FIG. 3, the VMMM (102) is configured to periodically poll the network device (310) for link statistics (112).

If the link (192) coupling the network device (310) to the particular server (312) is degrading, the method of FIG. 3 continues by migrating (314) a virtual machine (316) executing on the particular server (312) to a destination server (318). Migrating (314) a virtual machine (316) executing on the particular server (312) to a destination server (318) may be carried out in various ways including for example, by copying data representing the VM from the particular servers (312) memory and writing the data to the memory of the destination server (318) thereby insuring an exact copy of the instance of the VM operating on the particular server (312), loading a preconfigured image of a default virtual machine (the same image used to create the particular VM (316)), retrieving form the particular server (312) a configuration file specifying various attributes of the particular VM (316) and using the attributes to start another VM (336) on the destination server (318) and so on. Migrating (314) a virtual machine may also include also include migrating any applications executing within the virtual machine.

Figure 4:
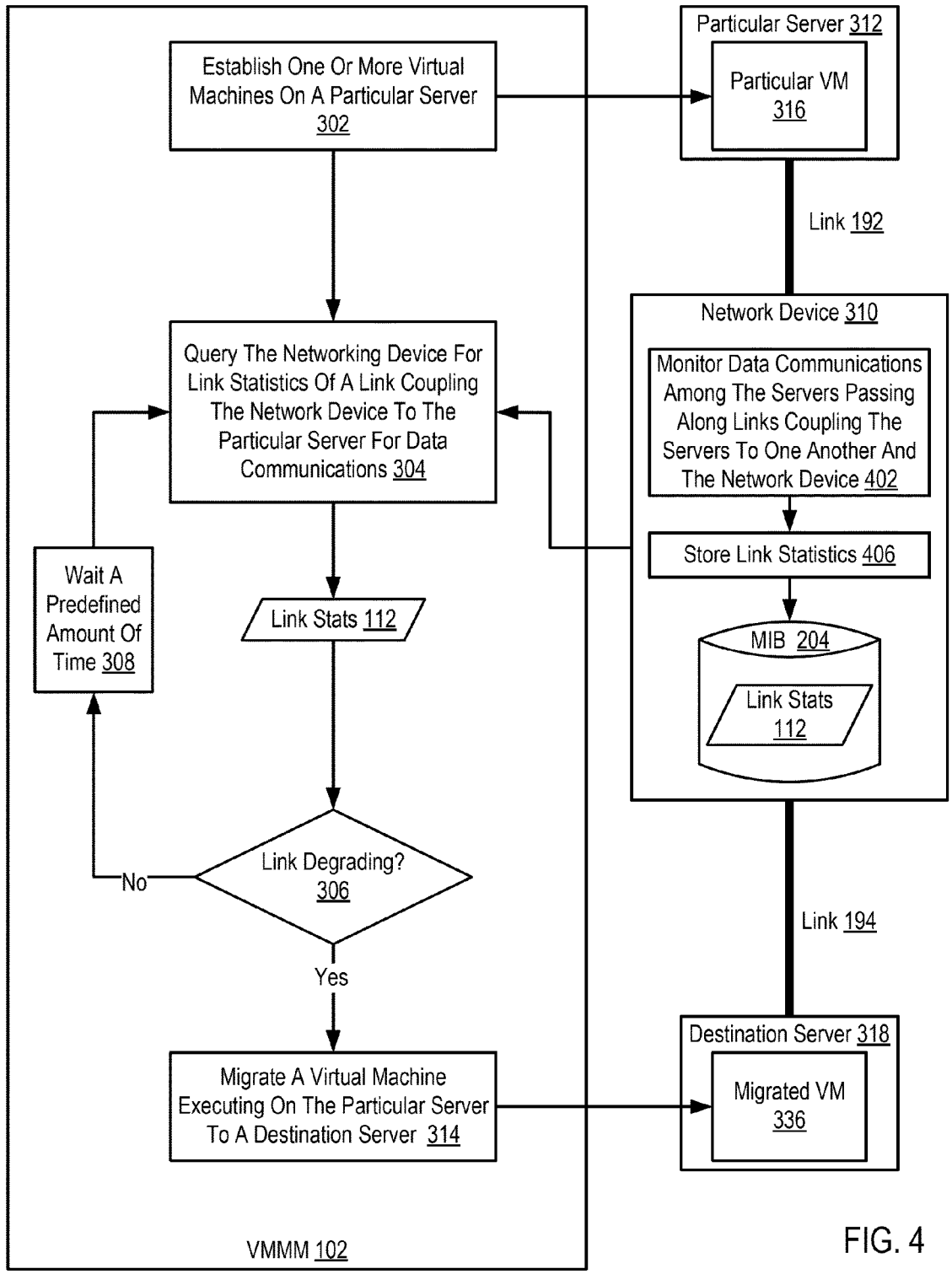
FIG. 4 sets forth a flow chart illustrating a further exemplary method for migrating virtual machines among networked servers according to embodiments of the present invention.

For further explanation, FIG. 4 sets forth a flow chart illustrating a further exemplary method for migrating virtual machines among networked servers according to embodiments of the present invention. The method of FIG. 4 is similar to the method of FIG. 3, including as it does, establishing (302) one or more virtual machines (316) on a particular server (312), querying (304) the networking device (310), determining (306) whether the link (192) is degrading, and migrating (314) a virtual machine (316) to a destination server (318) if the link (192) is degrading.

The method of FIG. 4 differs from the method of FIG. 3, however, in that the method of FIG. 4 includes monitoring (402), by the network device (310), data communications among the servers passing along links (192, 194) coupling the servers to one another and the network device (310) and storing (406), in a management information base ('MIB') accessible by the VMMM (102), link statistics (112) describing the data communications among the servers passing along the links coupling the servers to one another and the network device. The network device (310) may monitor data communications in a variety of ways. By monitoring, for each link, a number of bytes transmitted from the network device along a particular link, a number of bytes received by the network device along the particular link, a number of bytes received in error from a particular link, a number of instances of symbol errors, and so on as will occur to readers of skill in the art.

Figure 5:
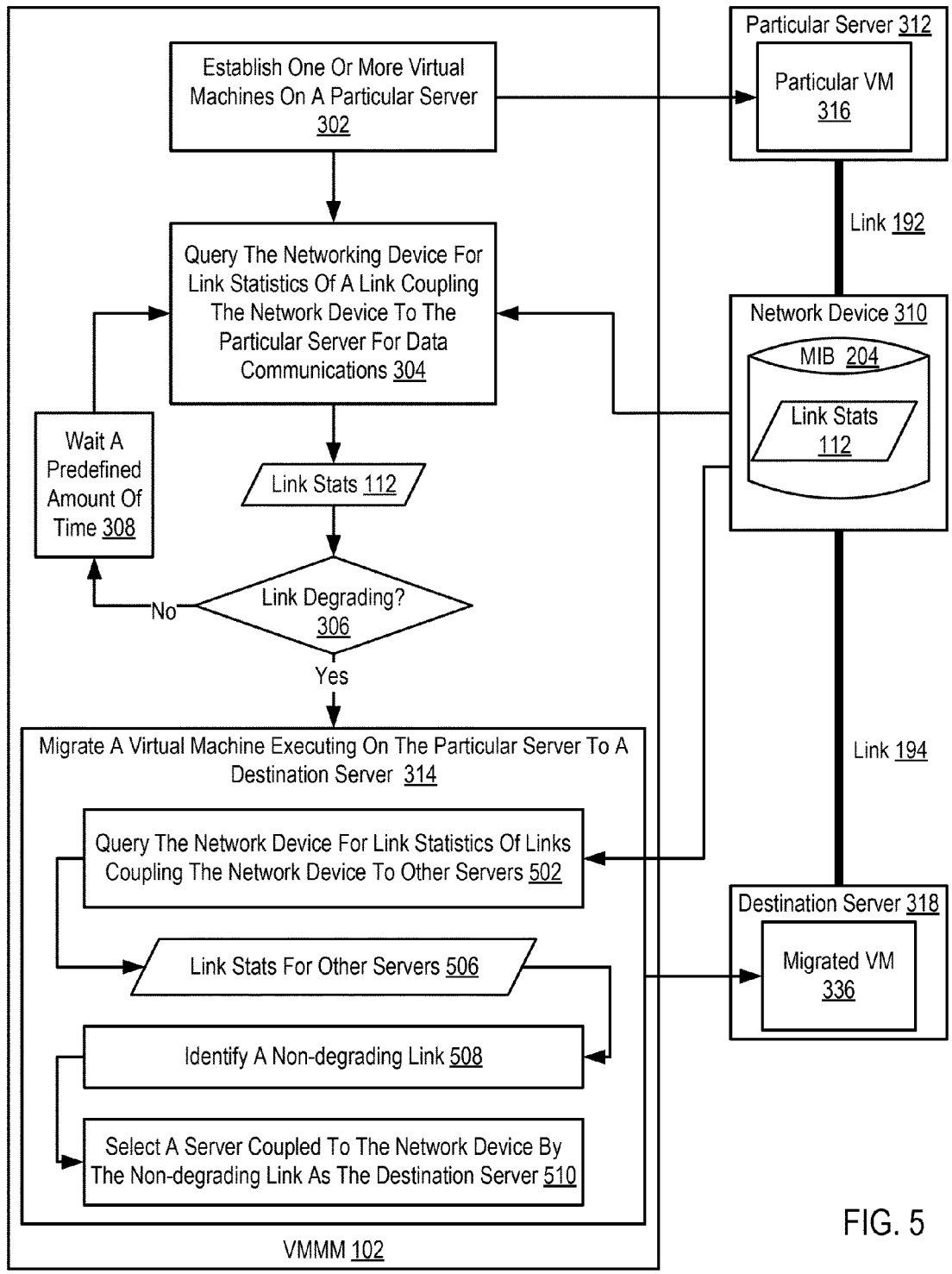
FIG. 5 sets forth a flow chart illustrating a further exemplary method for migrating virtual machines among networked servers according to embodiments of the present invention.

For further explanation, FIG. 5 sets forth a flow chart illustrating a further exemplary method for migrating virtual machines among networked servers according to embodiments of the present invention. The method of FIG. 5 is similar to the method of FIG. 3, including as it does, establishing (302) one or more virtual machines (316) on a particular server (312), querying (304) the networking device (310), determining (306) whether the link (192) is degrading, and migrating (314) a virtual machine (316) to a destination server (318) if the link (192) is degrading.

The method of FIG. 5 differs from the method of FIG. 3, however, in that in the method of FIG. 5, migrating (314) a virtual machine (316) to a destination server (318) if the link (192) is degrading further comprises querying (502) the network device for link statistics of links coupling the network device to other servers, identifying (508), in dependence upon the link statistics, a non-degrading link, and selecting (510) a server coupled to the network device by the non-degrading link as the destination server (318) for the virtual machine executing on the particular server. That is, in the method of FIG. 5, the VMMM migrates the virtual machine from the particular server (312) due to a degrading link to another server that is not coupled to the network and the network device (310) via a degrading link. If multiple servers are present with a non-degrading link, the VMMM may select (510) as server as the destination server (510) for the particular VM (316) in various ways including: in accordance with a round robin style selection algorithm; in accordance with a set of rules specifying a next server to select as a destination server; by optimization routines for workload balancing; and in other ways as will occur to readers of skill in the art.

Figure 6:
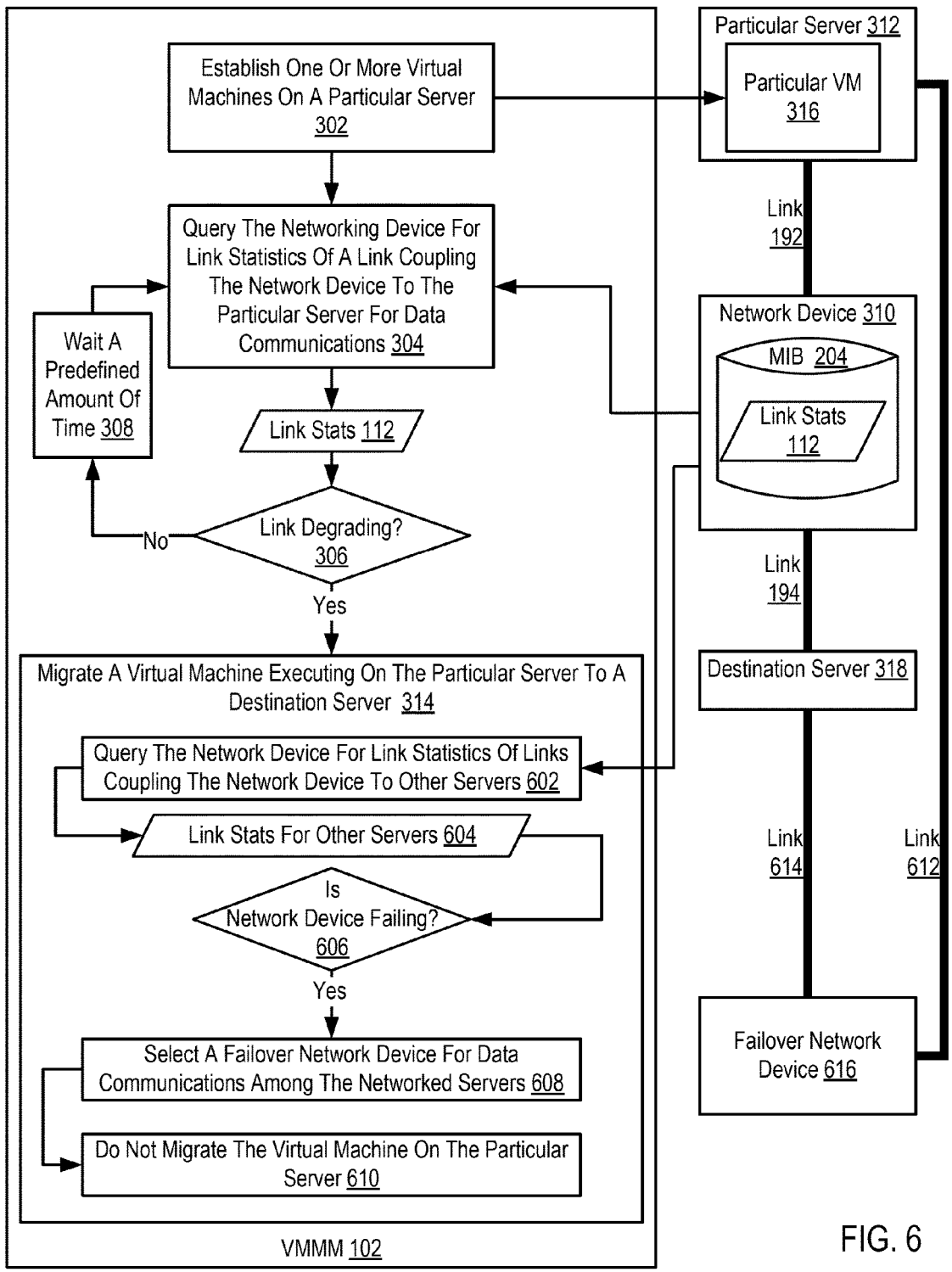
FIG. 6 sets forth a flow chart illustrating a further exemplary method for migrating virtual machines among networked servers according to embodiments of the present invention.

For further explanation, FIG. 6 sets forth a flow chart illustrating a further exemplary method for migrating virtual machines among networked servers according to embodiments of the present invention. The method of FIG. 6 is similar to the method of FIG. 3, including as it does, establishing (302) one or more virtual machines (316) on a particular server (312), querying (304) the networking device (310), determining (306) whether the link (192) is degrading, and migrating (314) a virtual machine (316) to a destination server (318) if the link (192) is degrading.

The method of FIG. 6 differs from the method of FIG. 3, however, in that in the method of FIG. 6, migrating (314) the virtual machine is carried out only if a non-degrading link is available. That is, in the method of FIG. 6, migrating (314) the virtual machine (316) includes querying (602) the network device for link statistics (602) of links coupling the network device to other servers and determining (606), in dependence upon the link statistics of links coupling the network device to other servers (602), that the network device (310) is failing. That is, if link statistics form all other links indicate degrading links—no link is considered non-degrading—then the VMMM determines that the network device as a whole, rather than hardware or software supporting one link is failing.

The method of FIG. 6 also includes selecting (608) a failover network device (616) for data communications among the networked servers and not migrating (610) the virtual machine on the particular server. Selecting a failover network device (616) may be carried out in various ways, such as for example, by selecting a next available device specified on a list of failover devices. Selecting (608) a failover network device (616) may also include re-routing data communications through the failover network device (616), such as be establishing the links (612 and 614), rather than through network device (310) that has been determined to be failing.

In the method of FIG. 6, the network device (310) is failing rather than a possible hardware or software data communications failure of the server (312). As such, there is no need to migrate the virtual machine (316) to another server, as long as the server (312) is capable of data communications via the failover network device (616).

As mentioned above, migrating VMs in accordance with embodiments of the present invention, includes, among other steps, determining, by the VMMM in dependence upon link statistics, whether a link coupling a network device to a particular server is degrading. For further explanation, FIG. 7 sets forth a flow chart illustrating an exemplary method for determining (306), by the VMMM in dependence upon link statistics, whether a link coupling a network device to a particular server is degrading in accordance with embodiments of the present invention.

Figure 7:
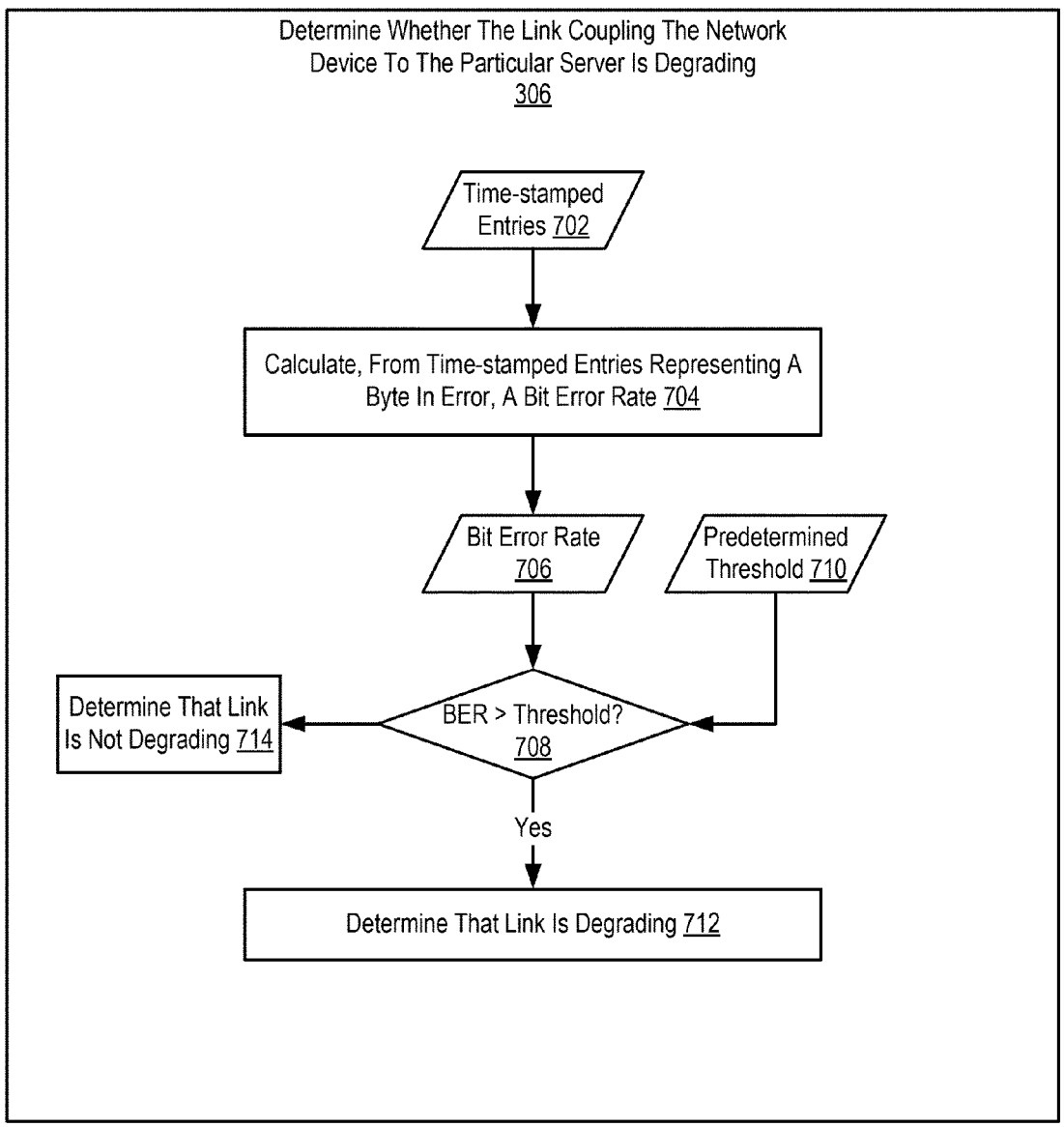
FIG. 7 sets forth a flow chart illustrating an exemplary method for determining, by the VMMM in dependence upon link statistics, whether a link coupling a network device to a particular server is degrading in accordance with embodiments of the present invention.

In the method of FIG. 7, the link statistics gathered by the network device include a number of time-stamped entries (702), each of which represents a byte in error received on the link coupling the network device to the particular server. Determining (306) whether a link coupling a network device to a particular server is degrading in the example of FIG. 7 is carried out by calculating (704), from the time-stamped entries representing a byte in error, a bit error rate (706) and determining (708) whether the calculated bit error rate (706)

is greater than a predetermined threshold (710). If the bit error rate (706) is not greater than the predetermined threshold (710), the VMMM carrying out the method of Figure determines (714) that the link is not degrading. If, however, the calculated bit error rate (706) is greater than the predetermined threshold (710), the VMMM determines (712) that the link coupling the network device to the particular server is degrading.

Figure 8:
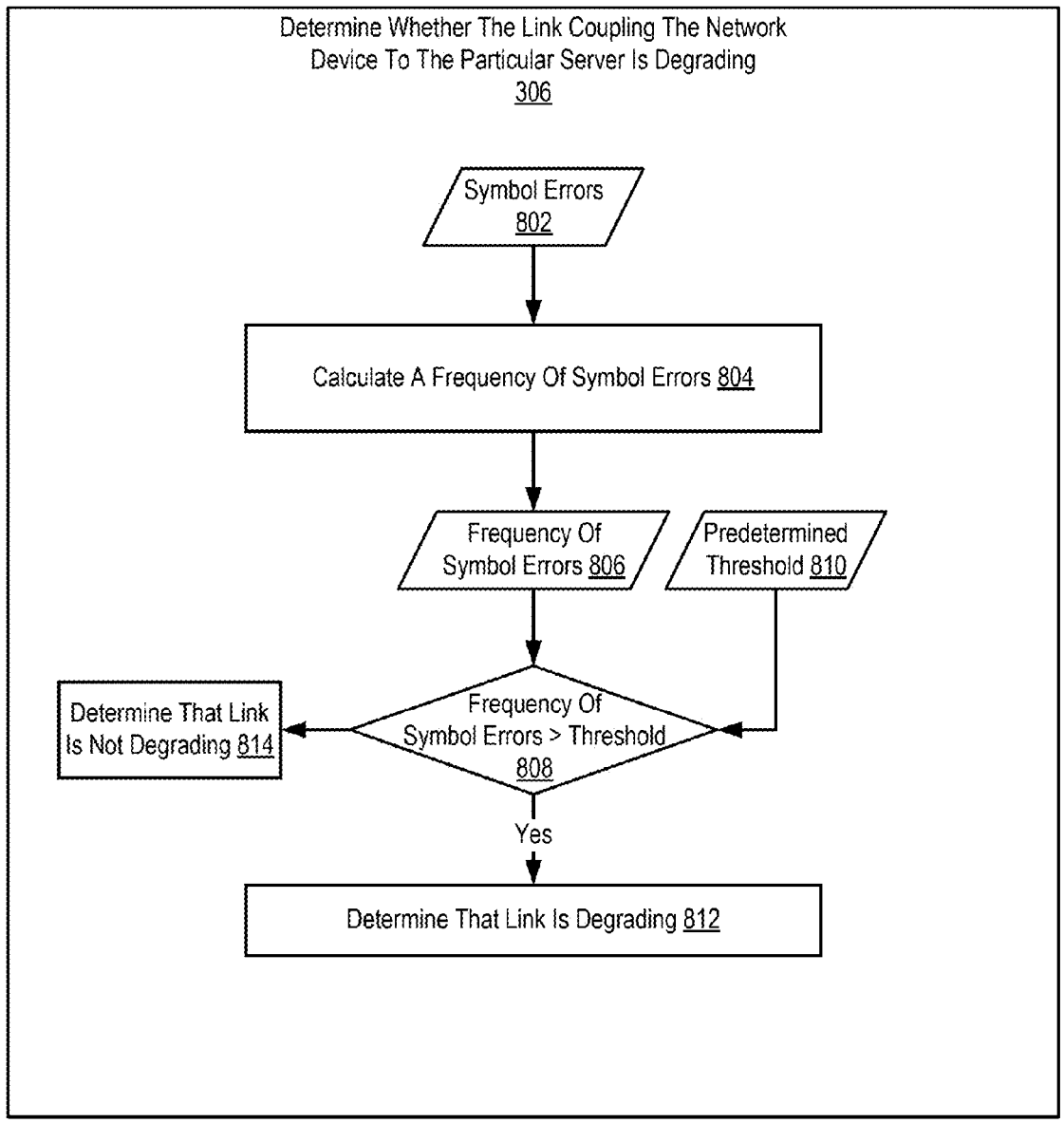
FIG. 8 sets forth sets forth a flow chart illustrating a further exemplary method for determining, by the VMMM in dependence upon link statistics, whether a link coupling a network device to a particular server is degrading in accordance with embodiments of the present invention.

FIG. 8 sets forth sets forth a flow chart illustrating a further exemplary method for determining (306), by the VMMM in dependence upon link statistics, whether a link coupling a network device to a particular server is degrading in accordance with embodiments of the present invention. In the method of FIG. 8, the link statistics gathered by the network device and provided to the VMMM carrying out the method of FIG. 8 include information describing symbol errors (802) of test data received on the link coupling the network device to the particular server. A symbol error (802) is an alteration of a symbol transmitted in test pattern to receiver. One example of a test patter includes a byte of data periodically sent to a network device by a server. Both the network device and the server are aware of the proper formation of the byte of data. If any one of the bits forming the test byte of data is incorrect the network switch will record the instance as a symbol error. Consider, for example, a test pattern comprising a byte of data sent from a server to a network switch with the following bit pattern: 11111111 pattern, and received as a 10001010. The network device will record an instance of a symbol error, and in some cases indicate a number of bit errors included in the instance of the symbol error. In this example, the network device may indicate that five bit errors occurred at the present instance of symbol error.

Determining (306) whether the link coupling the network device to the particular server is degrading includes calculating (804), in dependence upon the information describing symbol errors (802), a frequency (806) of the symbol errors and determining (808), in dependence upon the information describing symbol errors (802), whether a frequency (806) of symbol errors (802) on the link coupling the network device to the particular server is greater than a predetermined threshold (810). If the frequency (806) of symbol errors (802) is not greater than the predetermined threshold (810), the VMMM determines (814) that the link is not degrading. If the frequency (806) of symbol errors (802) is greater than the predetermined threshold (810), the VMMM determines (812) that the link coupling the network device to the particular server is degrading.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of migrating virtual machines among networked servers, the servers coupled for data communications with a data communications network, the network comprising a networking device, the method comprising:
    establishing, by a virtual machine management module ('VMMM'), one or more virtual machines on a particular server;
    determining, by the VMMM in dependence upon link statistics for a link coupling the network device to the particular server for data communications, whether the link coupling the network device to the particular server is degrading; and
    if the link coupling the network device to the particular server is degrading, migrating a virtual machine executing on the particular server to a destination server, wherein link statistics for a link coupling the network device to the destination server indicate that the link coupling the network device to the destination server is not degrading.

2. The method of claim 1 wherein migrating a virtual machine executing on the particular server to a destination server further comprises:
    querying the network device for link statistics of links coupling the network device to other servers;
    identifying, in dependence upon the link statistics, a non-degrading link; and
    selecting a server coupled to the network device by the non-degrading link as the destination server for the virtual machine executing on the particular server.

3. The method of claim 1 wherein migrating a virtual machine further comprises migrating the virtual machine only if a non-degrading link is available including:
    querying the network device for link statistics of links coupling the network device to other servers;
    determining, in dependence upon the link statistics of links coupling the network device to other servers, that the network device is failing;
    selecting a failover network device for data communications among the networked servers; and
    not migrating the virtual machine on the particular server.

4. The method of claim 1 wherein the link statistics include a plurality of time-stamped entries representing a byte in error received on the link coupling the network device to the particular server and determining whether the link coupling the network device to the particular server is degrading further comprises:
    calculating, from the time-stamped entries representing a byte in error, a bit error rate;
    determining whether the calculated bit error rate is greater than a predetermined threshold; and
    if the calculated bit error rate is greater than the predetermined threshold, determining that the link coupling the network device to the particular server is degrading.

5. The method of claim 1 wherein the link statistics include information describing symbol errors of test data received on the link coupling the network device to the particular server and determining whether the link coupling the network device to the particular server is degrading further comprises:
    calculating, in dependence upon the information describing symbol errors, a frequency of the symbol errors;
    determining, in dependence upon the information describing symbol errors, whether a frequency of symbol errors on the link coupling the network device to the particular server is greater than a predetermined threshold; and
    if the frequency of symbol errors is greater than the predetermined threshold, determining that the link coupling the network device to the particular server is degrading.

6. The method of claim 1 further comprising:
    monitoring, by the network device, data communications among the servers passing along links coupling the servers to one another and the network device; and
    storing, in a management information base ('MIB'), link statistics describing the data communications among the servers passing along the links coupling the servers to one another and the network device.

7. An apparatus for migrating virtual machines among networked servers, the servers coupled for data communications with a data communications network, the network comprising a networking device, the apparatus comprising a computer processor and a computer memory operatively coupled to the computer processor, the computer memory having disposed within it computer program instructions that when executed by the computer processor cause the apparatus to carry out the steps of:
    establishing, by a virtual machine management module ('VMMM'), one or more virtual machines on a particular server;
    determining, by the VMMM in dependence upon link statistics for a link coupling the network device to the particular server for data communications, whether the link coupling the network device to the particular server is degrading; and
    if the link coupling the network device to the particular server is degrading, migrating a virtual machine executing on the particular server to a destination server, wherein link statistics for a link coupling the network device to the destination server indicate that the link coupling the network device to the destination server is not degrading.

8. The apparatus of claim 7 wherein migrating a virtual machine executing on the particular server to a destination server further comprises:
   querying the network device for link statistics of links coupling the network device to other servers;
   identifying, in dependence upon the link statistics, a non-degrading link; and
   selecting a server coupled to the network device by the non-degrading link as the destination server for the virtual machine executing on the particular server.

9. The apparatus of claim 7 wherein migrating a virtual machine further comprises migrating the virtual machine only if a non-degrading link is available including:
   querying the network device for link statistics of links coupling the network device to other servers;
   determining, in dependence upon the link statistics of links coupling the network device to other servers, that the network device is failing;
   selecting a failover network device for data communications among the networked servers; and
   not migrating the virtual machine on the particular server.

10. The apparatus of claim 7 wherein the link statistics include a plurality of time-stamped entries representing a byte in error received on the link coupling the network device to the particular server and determining whether the link coupling the network device to the particular server is degrading further comprises:
    calculating, from the time-stamped entries representing a byte in error, a bit error rate;
    determining whether the calculated bit error rate is greater than a predetermined threshold; and
    if the calculated bit error rate is greater than the predetermined threshold, determining that the link coupling the network device to the particular server is degrading.

11. The apparatus of claim 7 wherein the link statistics include information describing symbol errors of test data received on the link coupling the network device to the particular server and determining whether the link coupling the network device to the particular server is degrading further comprises:
    calculating, in dependence upon the information describing symbol errors, a frequency of the symbol errors;
    determining, in dependence upon the information describing symbol errors, whether a frequency of symbol errors on the link coupling the network device to the particular server is greater than a predetermined threshold; and
    if the frequency of symbol errors is greater than the predetermined threshold, determining that the link coupling the network device to the particular server is degrading.

12. The apparatus of claim 7 further comprising computer program instructions capable of:
    monitoring, by the network device, data communications among the servers passing along links coupling the servers to one another and the network device; and
    storing, in a management information base ('MIB'), link statistics describing the data communications among the servers passing along the links coupling the servers to one another and the network device.

13. A computer program product for migrating virtual machines among networked servers, the servers coupled for data communications with a data communications network, the network comprising a networking device, the computer program product includes a computer readable storage device, wherein the computer readable storage device is not a signal, the computer readable device comprising computer program instructions that, when executed, cause a computer to carry out the steps of:
    establishing, by a virtual machine management module ('VMMM'), one or more virtual machines on a particular server;
    determining, by the VMMM in dependence upon link statistics for a link coupling the network device to the particular server for data communications, whether the link coupling the network device to the particular server is degrading; and
    if the link coupling the network device to the particular server is degrading, migrating a virtual machine executing on the particular server to a destination server, wherein link statistics for a link coupling the network device to the destination server indicate that the link coupling the network device to the destination server is not degrading.

14. The computer program product of claim 13 wherein migrating a virtual machine executing on the particular server to a destination server further comprises:
    querying the network device for link statistics of links coupling the network device to other servers;
    identifying, in dependence upon the link statistics, a non-degrading link; and
    selecting a server coupled to the network device by the non-degrading link as the destination server for the virtual machine executing on the particular server.

15. The computer program product of claim 13 wherein migrating a virtual machine further comprises migrating the virtual machine only if a non-degrading link is available including:
    querying the network device for link statistics of links coupling the network device to other servers;
    determining, in dependence upon the link statistics of links coupling the network device to other servers, that the network device is failing;
    selecting a failover network device for data communications among the networked servers; and
    not migrating the virtual machine on the particular server.

16. The computer program product of claim 13 wherein the link statistics include a plurality of time-stamped entries representing a byte in error received on the link coupling the network device to the particular server and determining whether the link coupling the network device to the particular server is degrading further comprises:
    calculating, from the time-stamped entries representing a byte in error, a bit error rate;
    determining whether the calculated bit error rate is greater than a predetermined threshold; and
    if the calculated bit error rate is greater than the predetermined threshold, determining that the link coupling the network device to the particular server is degrading.

17. The computer program product of claim 13 wherein the link statistics include information describing symbol errors of test data received on the link coupling the network device to the particular server and determining whether the link coupling the network device to the particular server is degrading further comprises:
    calculating, in dependence upon the information describing symbol errors, a frequency of the symbol errors;
    determining, in dependence upon the information describing symbol errors, whether a frequency of symbol errors on the link coupling the network device to the particular server is greater than a predetermined threshold; and if the frequency of symbol errors is greater than the predetermined threshold, determining that the link coupling the network device to the particular server is degrading.

18. The computer program product of claim 13 further comprising computer program instructions capable of:
monitoring, by the network device, data communications among the servers passing along links coupling the servers to one another and the network device; and
storing, in a management information base ('MIB'), link statistics describing the data communications among the servers passing along the links coupling the servers to one another and the network device.

* * * * *